United States Patent
Ravuri et al.

(10) Patent No.: US 12,108,319 B2
(45) Date of Patent: Oct. 1, 2024

(54) SYSTEMS AND METHODS FOR HYBRID HARDWARE AND SOFTWARE IMPLEMENTATION OF MULTIPLE WIRELESS STANDARDS

(71) Applicant: EdgeQ, Inc., Santa Clara, CA (US)

(72) Inventors: Vinay Ravuri, Cupertino, CA (US); Chaekwan Lee, San Jose, CA (US); Hariprasad Gangadharan, Karnataka (IN); Umesh Dattatraya Nimbhorkar, Karnataka (IN); Vishwanatha Tarikere Basavaraja, Karnataka (IN); Sriram Rajagopal, Karnataka (IN); Tae ryun Chang, San Ramon, CA (US); Gopalakrishnan Perur Krishnan, Bangalore (IN)

(73) Assignee: EdgeQ, Inc., Santa Clara, CA (US)

( * ) Notice: Subject to any disclaimer, the term of this patent is extended or adjusted under 35 U.S.C. 154(b) by 520 days.

(21) Appl. No.: 17/380,640

(22) Filed: Jul. 20, 2021

(65) Prior Publication Data
US 2023/0026248 A1     Jan. 26, 2023

(51) Int. Cl.
*H04W 40/02*       (2009.01)
*H04W 24/02*       (2009.01)
*H04W 88/08*       (2009.01)

(52) U.S. Cl.
CPC ........... *H04W 40/02* (2013.01); *H04W 24/02* (2013.01); *H04W 88/08* (2013.01)

(58) Field of Classification Search
CPC ..... H04W 40/02; H04W 24/02; H04W 88/08; H04W 88/10
See application file for complete search history.

(56) References Cited

U.S. PATENT DOCUMENTS

| | | |
|---|---|---|
| 2005/0282534 A1 | 12/2005 | Subramanian et al. |
| 2013/0286973 A1 | 10/2013 | Selia et al. |
| 2019/0274183 A1 | 9/2019 | Pelletier et al. |

(Continued)

OTHER PUBLICATIONS

International Search Report and Written Opinion of the International Searching Authority mailed Nov. 23, 2022 in related PCT application No. PCT/US22/36741, (11 pgs).

(Continued)

*Primary Examiner* — Mazda Sabouri
(74) *Attorney, Agent, or Firm* — North Weber & Baugh; Michael North (57) ABSTRACT

Advances in wireless technologies have resulted in the ability of a wireless communication system to support wireless communications of different standards, e.g., 5G, LTE, and Wi-Fi. Different Wireless standards have aspects which are very different from each other. Described in the present disclosure are embodiments of architecture with hardware and software split to allow implementation of different wireless standards along a configurable signal process path. The configurable signal process path comprises software configurable operators that may be configured in a desired level of granularity to load desirable software to process signals of various standards on the same hardware. Embodiments of the disclosed architecture with hybrid hardware and software implementation may improve system operation efficiency and lower system complexity to serve communications across multiple wireless standards.

7 Claims, 8 Drawing Sheets

(56) References Cited

U.S. PATENT DOCUMENTS

2020/0068462 A1     2/2020   Zetterberg et al.
2020/0099762 A1     3/2020   Eckhardt et al.

OTHER PUBLICATIONS

Michael et al. Design of Multistandard Channelization Accelerators for Software Defined 2, 3 Radio Handsets. May 22, 2014. Retrieved from the internet <URL:https://www.academia.edu/15466780/Design_of_Multistandard_Channelization_Accelerators_for_Software_Defined_Radio_Handsets adio-Handsets.pdf>, (14 pgs).

SYSTEMS AND METHODS FOR HYBRID HARDWARE AND SOFTWARE IMPLEMENTATION OF MULTIPLE WIRELESS STANDARDS

TECHNICAL FIELD

The present disclosure relates generally to a unified wireless architecture that allows implementing different wireless standards on a configurable processing path and also allows variation in versions of standards. More particularly, the present disclosure relates to architecture for hybrid hardware and software implementation of multiple wireless standards.

BACKGROUND

The importance of wireless communication in today's society is well understood by one of skill in the art. Advances in wireless technologies have resulted in the ability of a communication system to support wireless communications of different standards, e.g., 5G New Radio (NR), 4G LTE, Wi-Fi, etc. Different wireless standards have aspects which are very different from each other—fundamental frame structures, timing of symbols, forward error correction (FEC) codes.

Wireless nodes, such as cellular base stations and Wi-Fi access points, service wireless devices within a geographical cell or network. These geographical locations often overlap such that different types of wireless connections may be present within close proximity to each other (although operating at different frequencies). Recently, wireless communication systems have begun to converge to allow a wireless device to connect across a variety of different types of wireless networks. Implementing specialized hardware to process each standard results in large and complex hardware, increases power consumption for operation, and drives up the cost of the of the whole system.

With advanced compute capabilities, growing convergence of wireless standards and constraints on spectrum availability, there is requirement to run multiple wireless standards (e.g., 4G LTE, 5G NR, and/or Wi-Fi) at a single node. The current hardware architecture within these nodes is less desirable as signal processing paths through the node are dedicated to a single type of wireless communication and oftentimes use components specific to its particular wireless standard. This architecture results in deficiencies in resource use as certain paths/components may be under-utilized over time. As the need for inter-operability among different types of wireless standards increases, improvements in resource flexibility and system configurability will become more important.

Accordingly, what is needed are systems, devices and methods that address the above-described issues.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" or "packet" shall not be interpreted as limiting embodiments of the present invention to 5G networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. Open RAN Deployment Models

A radio access network (RAN) is part of a telecommunication system. It implements a radio access technology (RAT) to provide connection between a device, e.g., a mobile phone, and a core network (CN). Open RAN is an approach based on interoperability and standardization of RAN elements including a unified interconnection standard for white-box hardware and open source software elements from different vendors.

Figure 1:
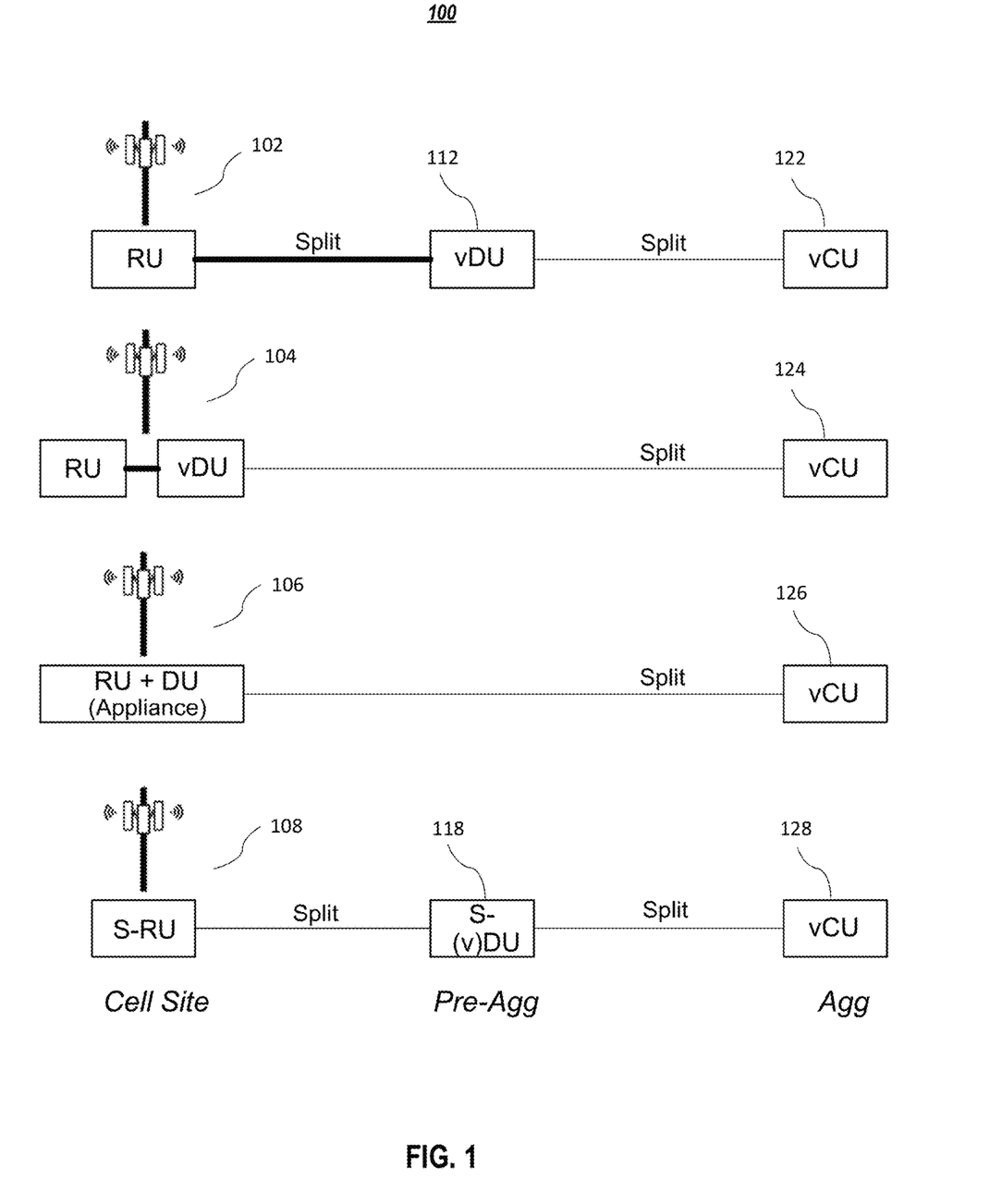
FIG. 1 depicts various open radio access network (RAN) deployments for a telecommunication service provider, according to embodiments of the present disclosure.

FIG. 1 depicts various open radio access network (RAN) deployments for a telecommunication service provider, according to embodiments of the present disclosure. As shown in FIG. 1, a radio unit (RU) 102 may couple to a virtual distribution unit (vDU) 112 with a split, e.g., ORAN 7-2 split, which is a Low PHY/High PHY split for ultra-reliable low-latency communication (URLLC) and near-edge deployment. The vDU 112 then couples to a virtual central unit (vCU) 122 with a split, e.g., split 2, which is referred as radio resource control and packet data convergence control split from the Layer 2 radio link control (RLC). Alternatively, a vDU may be deployed on the side of an RU 104, and then couples to a vCU 124 with a split, e.g., split 2. Alternatively, a distribution unit (DU) and an RU may be integrated as an appliance 106, which then couples to a vCU 126 with a split, e.g., split 2. Alternatively, a RU may be a small cell RN (S-RU) 108 couples to a small cell DU or vDU (S-vDU) 118 using a split, e.g., a MAC/PHY layer split (split 6). The S-vDU 118 then couple to a vCU 128 with a split, e.g., split 2.

A service provider (SP) may adopt more than one Open RAN deployment models based on band, fronthaul bandwidth requirements, or deployment type (macro/small cell), etc. Deployment models are influenced or decided based on multiple factors, including Fibre availability, real-estate/site/location constraints at pre-aggregation (Pre-Agg) and cell sites, total cost of ownership (TCO), Operational preference, etc. It is desirable for SPs to achieve maximum consistency around architecture, systems and operational model across all these deployment models.

With the continuous development of Wi-Fi technology, Wi-Fi access points (APs) may transmit or receive signals at a frequency (e.g., 2.4 GHz, 5 GHz, or 6 GHz) within the frequency range 1 (FR1) for 5G communications. An RU serving 5G communications may also be configured for transmitting or receiving 5G Wi-Fi signals. Accordingly, a 5G base station or a 5G small cell may be deployed to serve both 5G and Wi-Fi communications. However, using specialized or separate hardware to separately process the 5G and Wi-Fi standards would result in complex hardware, increase power consumption for operation, and drive up the cost of the of the whole system. It would be desirable to have a unified or at least partially unified signal processing path that may be configured to process different wireless standards to reduce system complexity and improve operation efficiency.

B. Embodiments of a Configurable Signal Processing Path

Different wireless standards have aspects, e.g., fundamental frame structures, timing of symbols, FEC codes, etc. However, some of the aspects of the PHY modem are similar, e.g., waveform (orthogonal frequency-division multiplexing, or OFDM), presence of pilots for channel estimation, beamforming, etc. Described in the present patent documents are embodiments of architecture with hardware and software split to allow implementation of different wireless standards on a configurable path.

Figure 2:
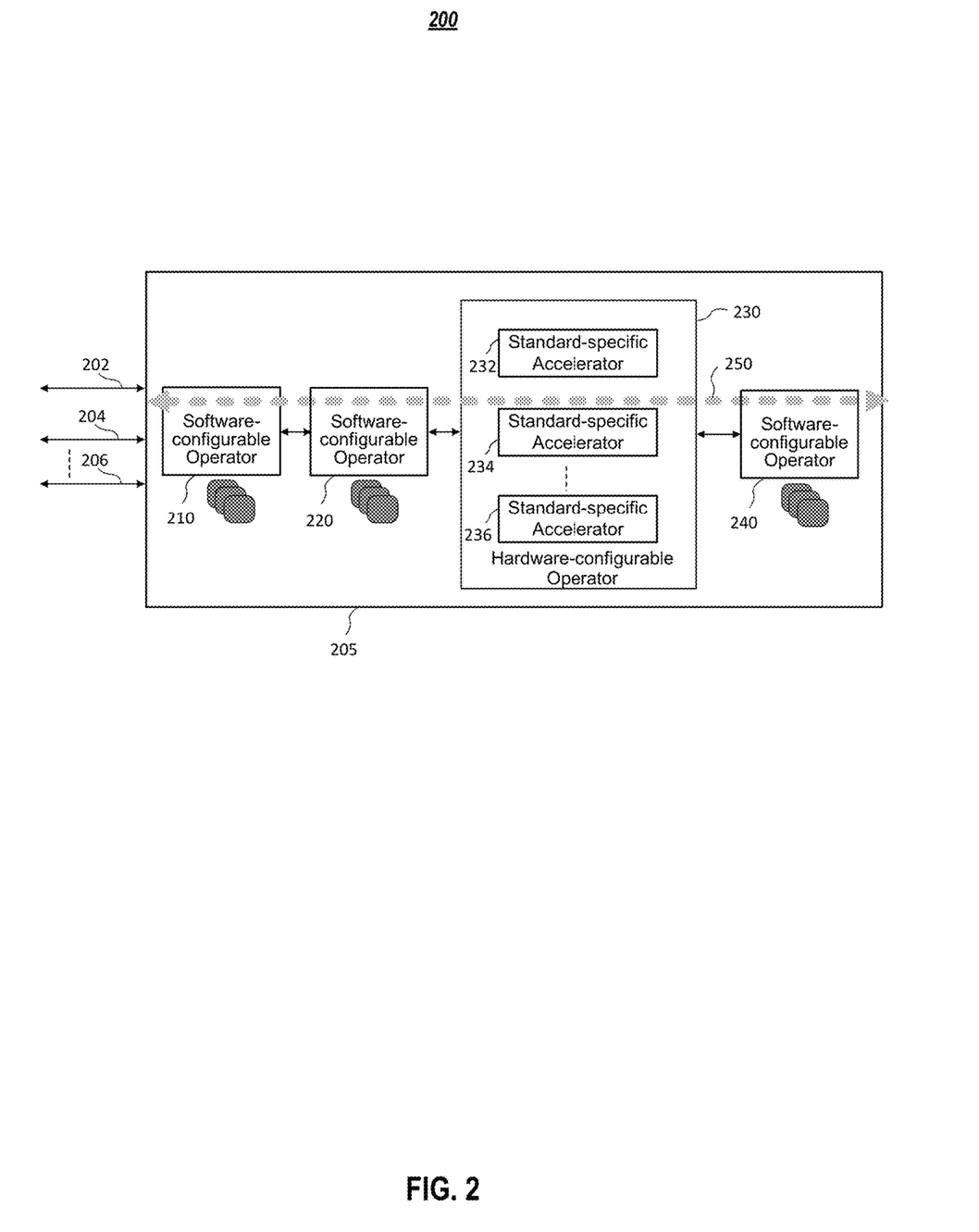
FIG. 2 depicts architecture with hybrid hardware and software implementation to process signals across different wireless standards along a configurable signal processing path, according to embodiments of the present disclosure.

FIG. 2 depicts architecture with hybrid hardware and software implementation to process signals across different wireless standards along a configurable signal processing path, according to embodiments of the present disclosure. The signal processing system 205 receives a plurality of wireless signals across different standards and processes these signals in a configurable signal processing path 250 in respective configurations. For example, the plurality of wireless signals may comprise a wireless signal 202 using 5G NR standards, a wireless signal 204 using LTE standards, a wireless signal 206 using Wi-Fi standards, etc.

The configurable signal processing path 250 involves one or more software-configurable operators, e.g., 210, 220, and 240, which may be configurable for implementing various signal processing operations according to the standard of wireless signal. For example, the software-configurable operator 210 may be configured for 5G signal processing when the software-configurable operator 210 processes the 5G wireless signal 202, or for LTE signal processing when the software-configurable operator 210 processes the LTE wireless signal 204, or for Wi-Fi signal processing when the software-configurable operator 210 processes the Wi-Fi wireless signal 206. Configuring for the one or more software-configurable operators may be controlled by a central control unit or by a local control unit with each software-configurable operator. Configuration of the configurable signal processing path 250 may be controlled or updated dynamically on a desirable granularity, e.g., a frame level, a subframe level, a slot level, a block level, etc.

Determination of a configuration for the configurable signal processing path may be dependent on one or more parameters, e.g., signal-to-noise ratio (SNR) of the wireless signals, priorities of the plurality of wireless signals, etc. The one or more software-configurable operators in the one or more software-configurable operators may be configured synchronously or asynchronously. For example, the software-configurable operator 210 may be configured for 5G NR signal processing in 20 ms, while the software-configurable operator 220 may configured for 5G NR signal processing in the same 20 ms, or differently in 15 ms. In one or more embodiments, different wireless signals may be processed in the configurable signal processing path with or without overlap. For example, when one software-configurable operator, e.g., a sample processing unit, is configured for operation in a first wireless standard, another software-configurable operator, a signal processing engine, may be configured for operation in another standard concurrently. In another example, a software-configurable operator, e.g., a signal processing engine, may comprise multiple units with different units capable of operation under different wireless standards. Accordingly, the signal processing engine may be operated for handling tasks of different wireless standards in parallel, or at partially in parallel corresponding to different wireless standards.

Such a software-configurable processing of multiple signal signals across different wireless standards improves resource (especially hardware) utility of the system, enhances interoperability of each operator, and increases system operation efficiency.

In one or more embodiments, the configurable signal processing path 250 involves at least one hardware-configurable operator 230, which comprises multiple standard-specific accelerators 232, 234, 236, etc. At a given moment, depending on the wireless standard of the signal to be processes, the hardware-configurable operator 230 selects one standard-specific accelerator that matches the wireless standard of the signal. At certain stages of wireless signal processing, it might be challenging, if not impossible, to use software-configurable components to process wireless signals of different standards to meet the efficiency or latency requirement, Therefore, it may be more desirable to use standard-specific hardware accelerators to respectively process wireless signals of different standards.

One skilled in the art shall understand that the term wireless standards may be referred as different types of wireless communication technologies, e.g., 5G NR, 4G LTE, Wi-Fi, etc. the wireless standard may be referred as different versions of one type wireless communication, e.g., Wi-Fi 4 (wireless-N) or Wi-Fi 5 (wireless-AC), etc.

In one or more embodiments, the configurable signal processing path 250 may be integrated within one integrated circuit (IC) for modem/PHY acceleration and configured to specifically process a wireless signal of RAT, e.g., 5G NR, such that the configurable signal processing path 250 is specifically operated as a 5G signal processing path. While some other configurable signal processing paths, integrated within other ICs for modem/PHY acceleration, may be configured to specifically process wireless signal of another RAT, e.g., Wi-Fi, such that the other configurable signal processing paths are specifically operated as Wi-Fi signal processing paths. In certain situation, when the modem/PHY acceleration may receive excessive 5G communication service requests while Wi-Fi scheduling tasks are less demanding, one or more Wi-Fi signal processing paths may be reconfigured as 5G signal processing paths such that the 5G communication service requests may be served effectively.

Figure 3:
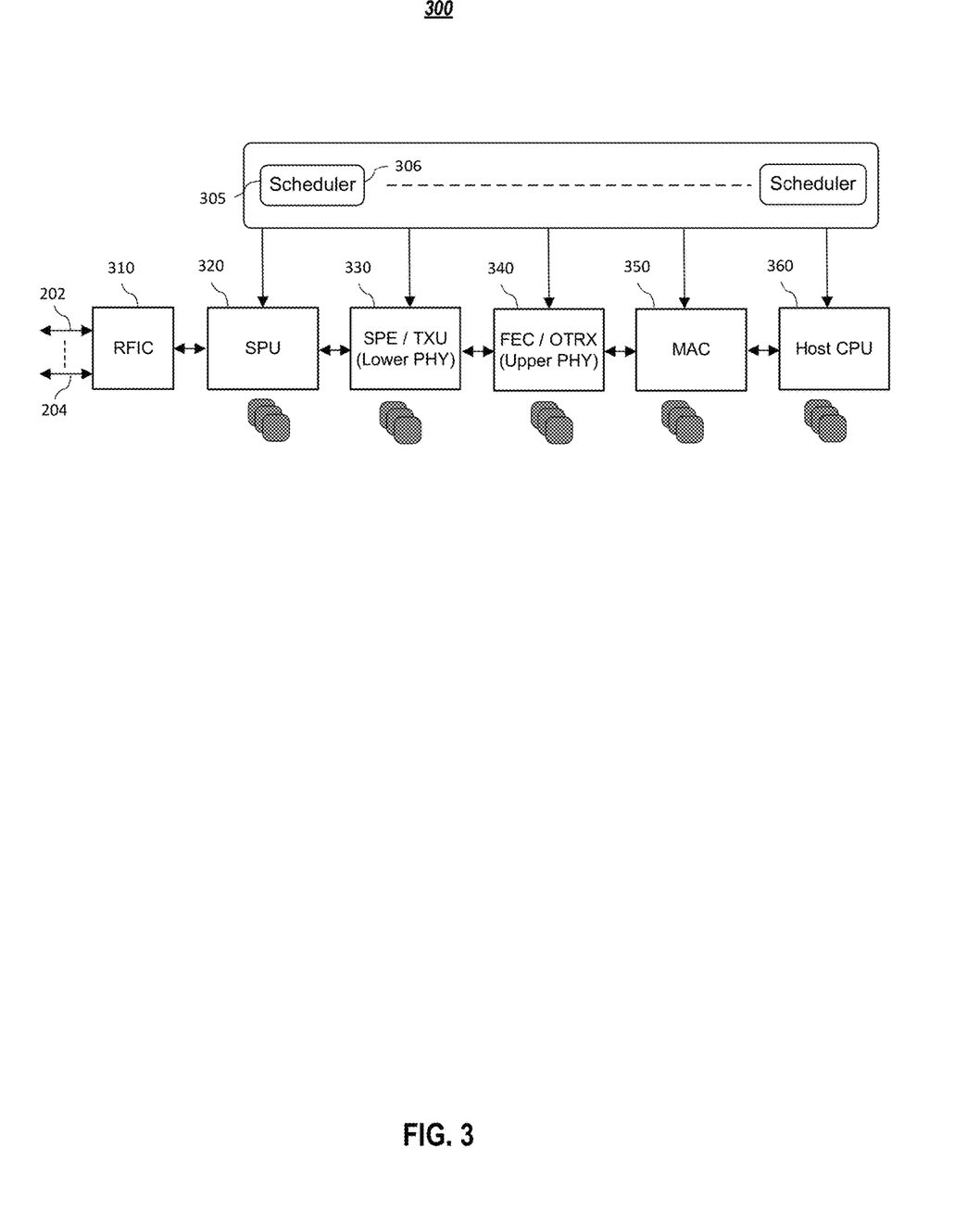
FIG. 3 depicts a system with multiple configurable operators to process signals across different wireless standards in a desired level of granularity, according to embodiments of the present disclosure.

FIG. 3 depicts a system with multiple configurable operators to process signals across different wireless standards in a desired level of granularity, according to embodiments of the present disclosure. A configurable signal processing path for adaptively processing a plurality of wireless signals across various standards may comprise a radio frequency integrated circuit (RFIC) 310, a sample processing unit (SPU) 320, a signal processing engine (SPE) 330, a forward error correction (FEC) unit 340, a media access control (MAC) accelerator 350, and a host processing CPU engine 360. The SPU 320, the SPE 330, the FEC unit 340, and the MAC accelerator 350 may couple to a central control unit 305, which comprises a plurality of schedulers 306 to perform designated scheduling operation. The central control unit 305 outputs one or more commands to each coupled operator to schedule desired wireless signal processing in a desired level of granularity. The one or more commands may comprise one or more commands to the MAC accelerator 350 for transport block (TB) processing, one or more forward error correction (FEC) commands to the FEC unit 340, one or more SPE commands to the SPE 330 for desired channel estimation, measurements, equalization, etc., and one or more SPU commands to the SPU 320.

In one or more embodiments, the central control unit is a multi-core operator comprising a plurality of cores, which may be configured to function as schedulers. The cores may be based on various architecture, e.g., ARM, x86, RISC-V, etc. architecture. Cores in the center control unit 305 may be highly configurable for various tasks. One skilled in the art will recognize that various types of processing cores may be implemented across different embodiments of the invention.

Furthermore, the PHY schedulers 306 may play other important roles. With simultaneous carriers and carriers with different sub-carrier spacing being deployed, the schedulers need to control operations on PHY being performed for each carrier to meet symbol/slot timing and also operations of interface to the higher layer (L2) at specified slot timings. Such operations may also be soft-configurable for desired functionality.

Certain wireless standards, e.g., Wi-Fi standard, bring specific challenges. Due to strict timing latency requirements, most of the PHY and the higher layers are implemented on same device. The PHY on the sample processing may need to perform channel monitoring and power measurements. Such operations may need to be integrated into the SPU hardware for quick turnaround times.

Figure 4:
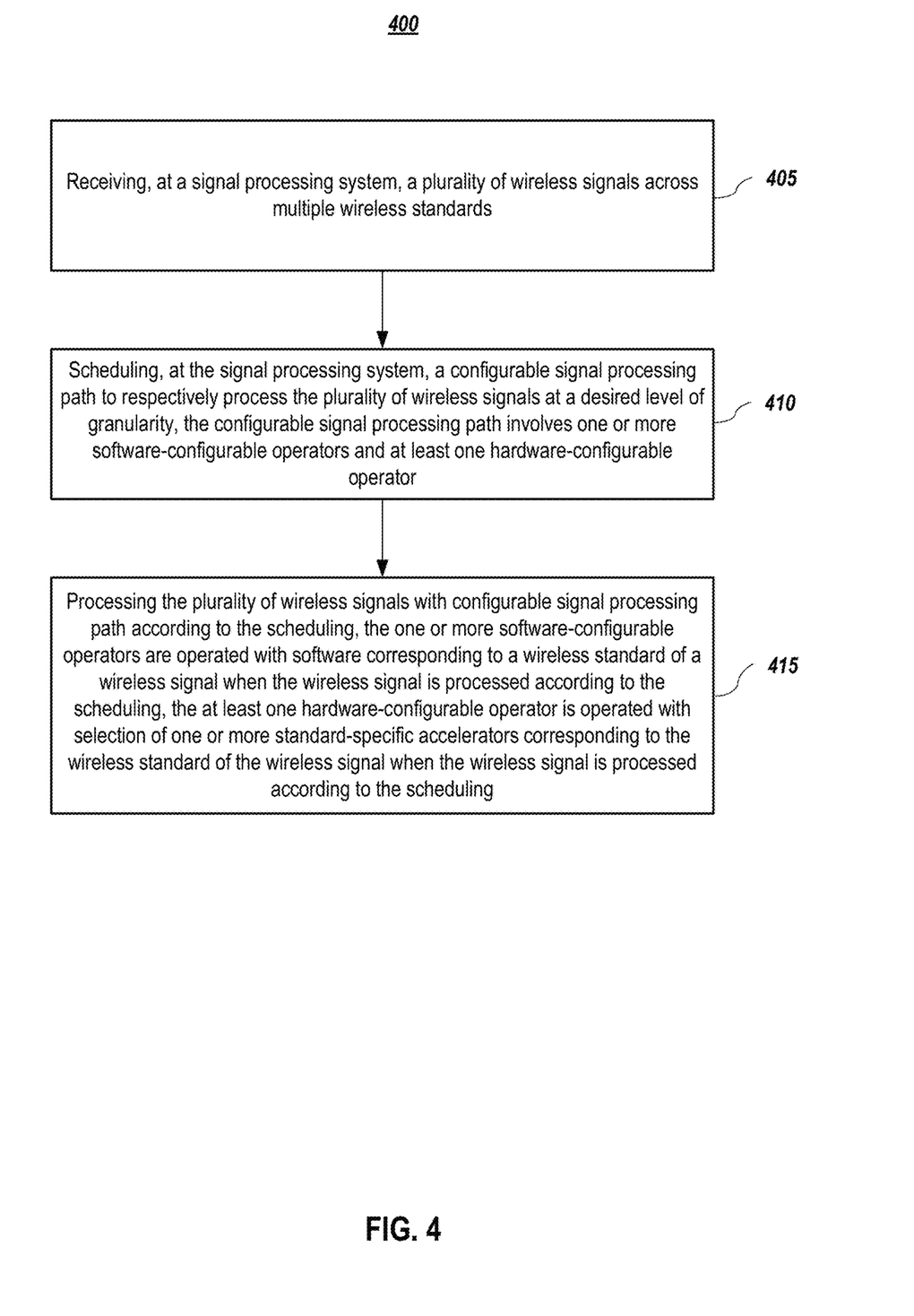
FIG. 4 depicts a method to process signals across different wireless standards along a configurable signal processing path with hybrid hardware and software implementation, according to embodiments of the present disclosure.

FIG. 4 depicts a method to process signals across different wireless standards along a configurable signal processing path with hybrid hardware and software implementation, according to embodiments of the present disclosure. In step 405, a signal processing system receives a plurality of wireless signals across multiple wireless standards. The signal processing system comprises one or more software-configurable operators configurable for implementing various signal processing operations according to the standard of wireless signal. The signal processing system may also comprise at least one hardware-configurable operator, which comprises multiple standard-specific accelerators for desired signal processing respectively. In step 410, the signal processing system schedules a configurable signal processing path to respectively process the plurality of wireless signals at a desired level of granularity. The configurable signal processing path involves one or more software-configurable operators and at least one hardware-configurable operator. In step 415, the signal processing system processes the plurality of wireless signals with configurable signal processing path according to the scheduling. The one or more software-configurable operators are operated with software corresponding to a wireless standard of a wireless signal when the wireless signal is processed according to the scheduling. The at least one hardware-configurable operator is operated with selection of one or more standard-specific accelerators corresponding to the wireless standard of the wireless signal when the wireless signal is processed according to the scheduling. The one or more software-configurable operators may comprise one or more of a sample processing unit (SPU), a signal processing engine (SPE) on a radio unit (RU), an enhanced Commion Public Radio Interface (eCPRI) fronthaul on a RU, an enhanced Common Public Radio Interface (eCPRI) fronthaul, a SPE on a distribution unit (DU), a FEC on a DU, a packet processing unit (PPU), or a monolith gNodeB/eNodeB/Wi-Fi access point incorporating all of the above components.

C. Embodiments of Hardware and Software Partitioning 5G services are expected to cover Macro overlays, Small cells, low latency applications in industries and machine to machine communications. Each mode has its unique requirement. In 5G deployments, different components of the network are being envisioned—complete gNB, RU/DU with front haul. An RU has RF operations and also some low-level baseband PHY operations. The information from RU is communicated as frequency domain data via a protocol called eCPRI (enhanced Common Public Radio Interface) over Ethernet to a DU. The DU implements most of the baseband PHY stack which is compatible for the 5G or 4G/LTE standards and for proprietary expansions. The DU may also host upper layer operations of MAC, scheduler, and RLC. The location or destination to deploy these components in a network may be determined by aggregation capability and resource availability, such as the FrontHaul throughput and latency. Multiple sectors or RUs may be aggregated into a DU which runs baseband functions for them. In some other situations, in a small cell, these baseband functions may converge into a single gNB component.

Figure 5:
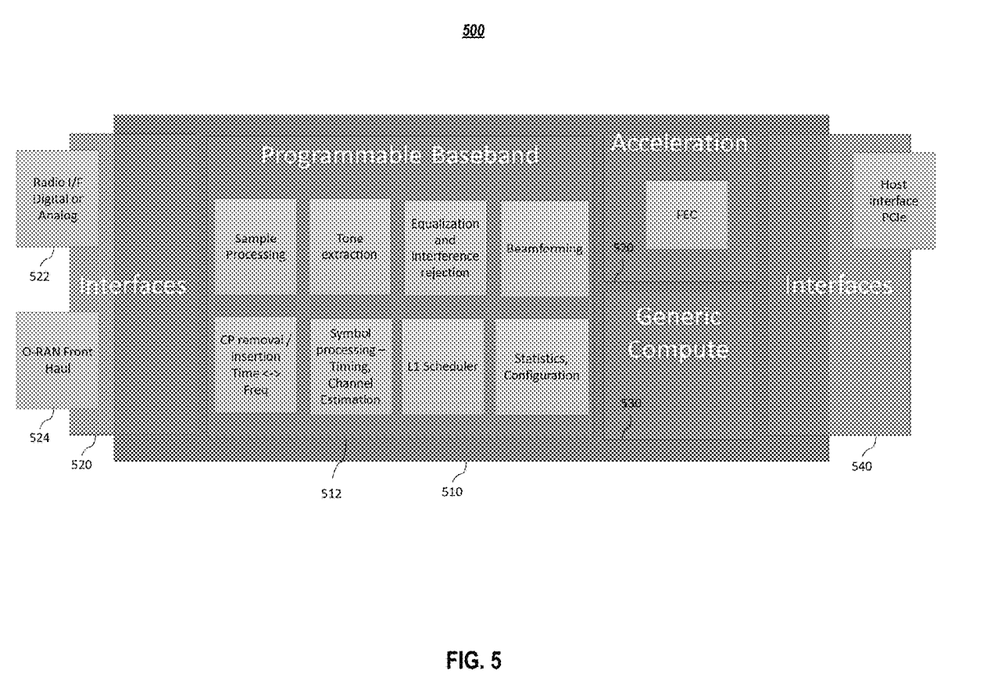
FIG. 5 depicts a block diagram of programmable baseband tasks for processing signals across different wireless standards, according to embodiments of the present disclosure.

In one or more embodiments of the present disclosure, certain software implementations for signal processing across different wireless standards may be integrated together on a single programmable baseband 512 in a signal processing system 510, as shown in FIG. 5. The programmable baseband 512 is able to transmit or receive wireless signals via one or more interfaces, e.g., a digital or analog radio interface (I/F) 522 and/or an O-RAN Front Haul interface 524, etc. The programmable baseband 512 may be software-configurable to perform one or more standard-specific operations of sample processing, tone extraction, equalization and interference rejection, beam forming, cyclic prefix (CP) removal/insertion, layer 1 scheduler, and statistics configuration, etc.

The programmable baseband 512 couples to a FEC unit 520, which may be hardware-configurable to perform desired operations, e.g., encoding/decoding, etc., using standard-specific accelerators. The FEC unit 520 may also couple to one or more interfaces 540, such as a Host Peripheral Component Interconnect Express (PCIe) interface, for host communications. In certain situations, a generic computation unit 530 may couple to the programmable baseband 512 as a module reserved for possible function expansion.

Figure 6:
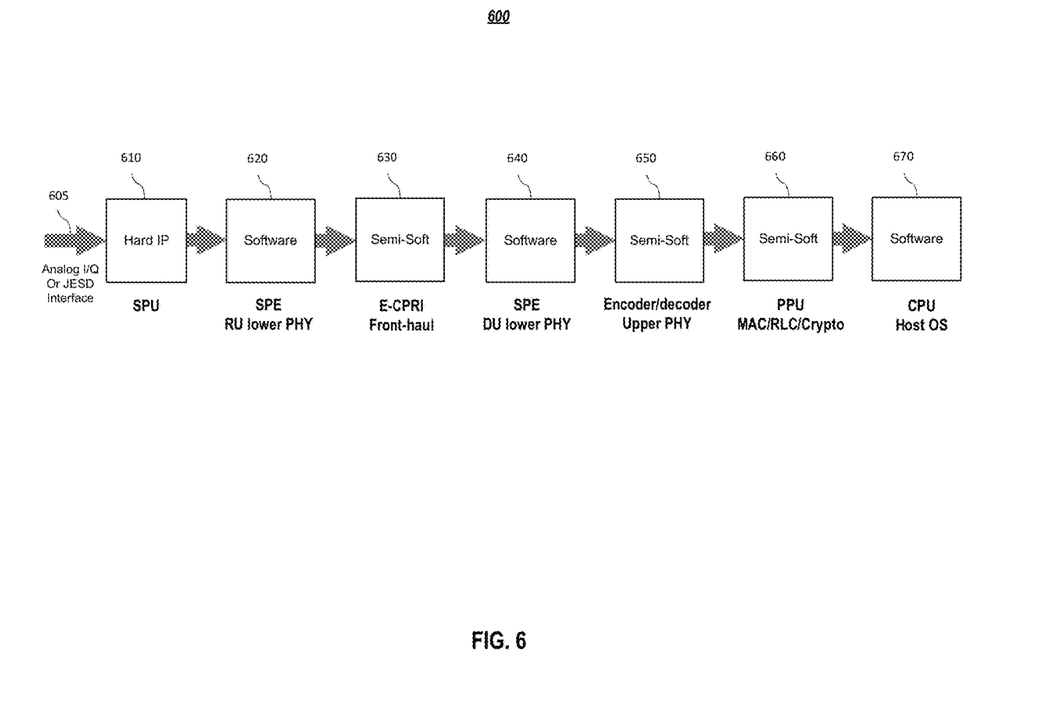
FIG. 6 depicts a block diagram of a configurable signal processing path with hardware and software partitioning, according to embodiments of the present disclosure.

FIG. 6 depicts a block diagram of a configurable signal processing path with hardware and software partitioning, according to embodiments of the present disclosure. The signal processing path receives signals 605 from an analog I/Q (in-phase and quadrature) interface or a JESD interface (a standardized serial interface used by data converters, e.g., ADCs and DACs, and logic devices, e.g., FPGAs or ASICs). An SPU unit 610 performs operations comprising one or more of analog-to-digital conversion, time synchronization, down/up conversion, sampling rate conversion, DC offset correction, IQ imbalance correction, crest factor reduction (CFR), and, digital pre-distortion (DPD), etc. Following the SPU unit 610, an SPE 620 on RU lower PHY performs operations comprising one or more of symbol processing, cyclic prefix (CP) removal, fast Fourier transform/inverse fast Fourier transform (FFT/IFFT), symbol/slot level scheduling, and eCPRI compression/decompression, etc. Following the SPE 620, an eCPRI Front-haul 630 performs operations comprising one or more of ORAN synchronizations, eCPRI packetization, user datagram protocol (UDP) acceleration, Ethernet termination, etc. Subsequently, an SPE 640 on DU lower PHY performs operations comprising one or more of demodulation reference signal (DMRS) signal insertion, channel estimation, equalization, beamforming, symbol/slot level scheduling, etc. Afterwards, an encoder/decoder unit 650 on DU upper PHY performs operations comprising one or more of FEC encoding/decoding, layer mapping/de-mapping, scrambling/descrambling, constellation mapping, and log-likelihood-ratio (LLR) generation, etc. Following the encoder/decoder unit 650, a packet processing unit (PPU) 660 performs a cyclic redundancy check (CRC) and/or a header parity check. Afterwards, a host center processing unit (CPU) or center control unit 670, is operable, by a host operation system (OS), to perform operations comprising one or more of operation of controllers for PCIe, USB, Ethernet, eCPRI, JESD, operation of schedulers for RLC, MAC, packet data convergence protocol (PDCP), etc. In one or more embodiments, the host CPU 660 may be a multi-core processor running on an OS (e.g., Linux) and board support package (BSP). The host CPU 660 may be loaded with various modem device drivers and be configured to support various crypto acceleration frameworks.

Components shown in FIG. 6 may be fixed, software-configurable (shown as block marked as "Software" in the figure), hardware-configurable (shown as block marked as Semi-Soft" in the figure). Hardware-configurable component may involve different standard-specific accelerators or interfaces operated on respective software, firmware, or kernel for desired signal processing operations corresponding to respective wireless standards.

Figure 7:
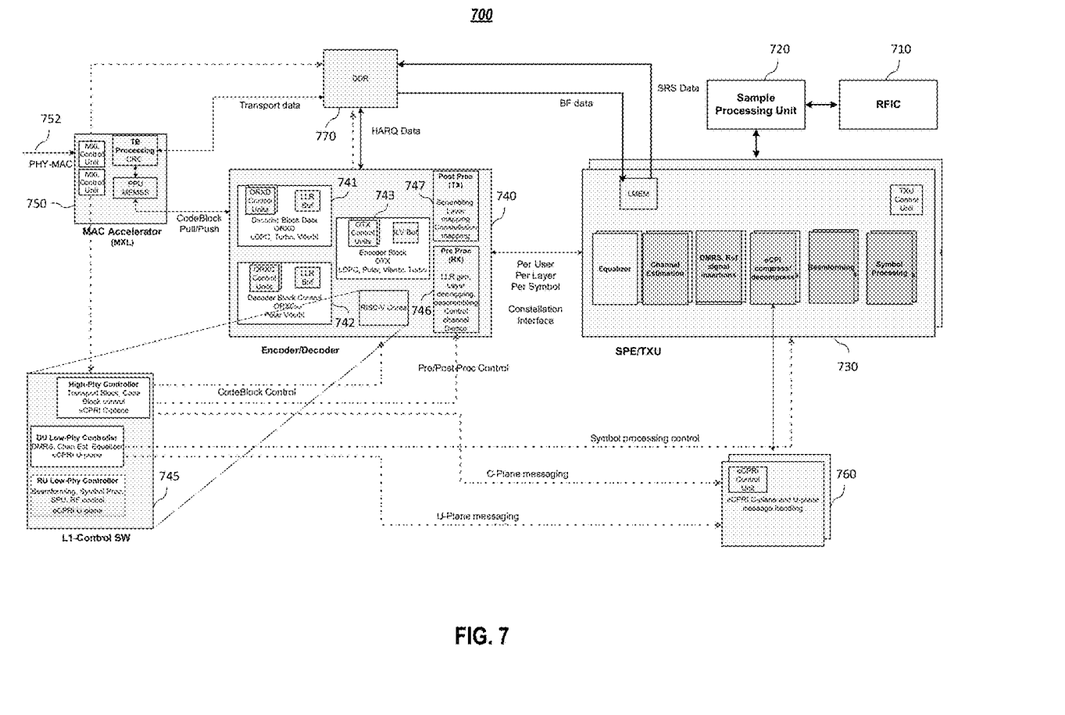
FIG. 7 depicts a functional overview of a configurable signal processing path with hybrid hardware and software implementation, according to embodiments of the present disclosure.

FIG. 7 depicts a functional overview of a configurable signal processing path with hybrid hardware and software implementation, according to embodiments of the present disclosure. The configurable signal processing path involves an RFIC 710, an SPU 720, a SPE 730, an encoder and decoder unit 740, and a MAC accelerator (MXL) 750.

When the configurable signal processing path is used for signal transmission, a transport block 752 is the payload from higher layers passed to PHY on a PHY-MAC interface, which may be defined by a network functional application platform interface (nFAPI). Alternatively, the transport block 752 may be stored within a memory 770 accessible by the MXL 750. Subsequently, encoding operation is performed at the encoder and decoder unit 740. Encoding operation may comprise CRC addition, segmenting to smaller code blocks, encoding these code blocks and rate matching to expect code rates. These coded blocks are then modulated, in a post processing unit 747, to complex constellations points like Quadrature Phase Shift Keying (QPSK), 16 QAM (quadrature amplitude modulation), 64 QAM, 256 QAM, 1024 QAM or 4096 QAM. In one or more embodiments, encoding operation is a hardware-configurable operation. In other words, a central control unit 745, which may be a multi-core processor, may activate one desirable encoder 743, among multiple encoders, to perform desirable encoding operation according a wireless standard that the code block (to be encoded) is planned to be transmitted.

Data stream of modulated coded blocks is mapped, in the SPE 730, to different layers (which determines the MIMO capacity of the system). These layers are mapped into time frequency grids and interspersed with reference signals. Operations, e.g., IFFT and CP addition, are implemented to generate time domain waveforms per symbols before upconverting and interfacing to radio frequency transmissions.

Alternatively, the signal processing path may also be used to process received wireless signals. The SPE 730 may be scheduled to perform signal receiving operations and outputs processed signals to a pre-processing unit 746 in the encoder and decoder unit 740, followed by a desired decoder to obtain decoded code blocks. The decoded code blocks are then pulled by the MXL 750 to generate a transport data for high layer usage.

Existing solutions of using different or distinct hardware for the Physical layer to meet all these requirements can be inefficient. An RU would also need fast accelerated FFT to support a number of time-to-frequency translations in short time. An O-RAN compliant Front Haul would need to be supported. On a DU, a similar O-RAN module may be needed. Subsequent frequency domain operations may be done on the DU for the PHY. While in FIG. 7, one or more components or operators may be software-configurable such that these components or operators may be configured in a desired level of granularity to load desirable software to process signals of various standards on the same hardware. Such a hybrid hardware and software implementation may improve system operation efficiency and lower system complexity to serve communications across multiple wireless standards.

In one or more embodiments, standard-specific accelerators may be necessary for some operators on the signal processing path in order to meet some performance criteria, e.g., a low latency or a high throughput requirement. The encoder and decoder unit 740 may be such an operator. At a given moment, depending on the wireless standard of the signal to be processes, the encoder and decoder unit 740 selects a corresponding standard-specific encoder 743 or decoder. The decoder may be a decoder block 741 for data or a decoder block 742 for control. Those standard-specific accelerators (encoders, decoders, etc.) may comprise integrated buffer to store standard-specific codes, kernel, or firmware.

The central control unit 745 may also output commands as C-Plane messages and/or U-Plane messages to an eCPRI C-plane and U-plane message handling unit 760 for desired Fronthaul operation. The C-Plane messages define scheduling, coordination required for data transfer, beam-forming, etc. While the U-Plane messages are used to define Data Compression, I/Q data transfer, DL data precoding, etc., for efficient data transfer.

Figure 8:
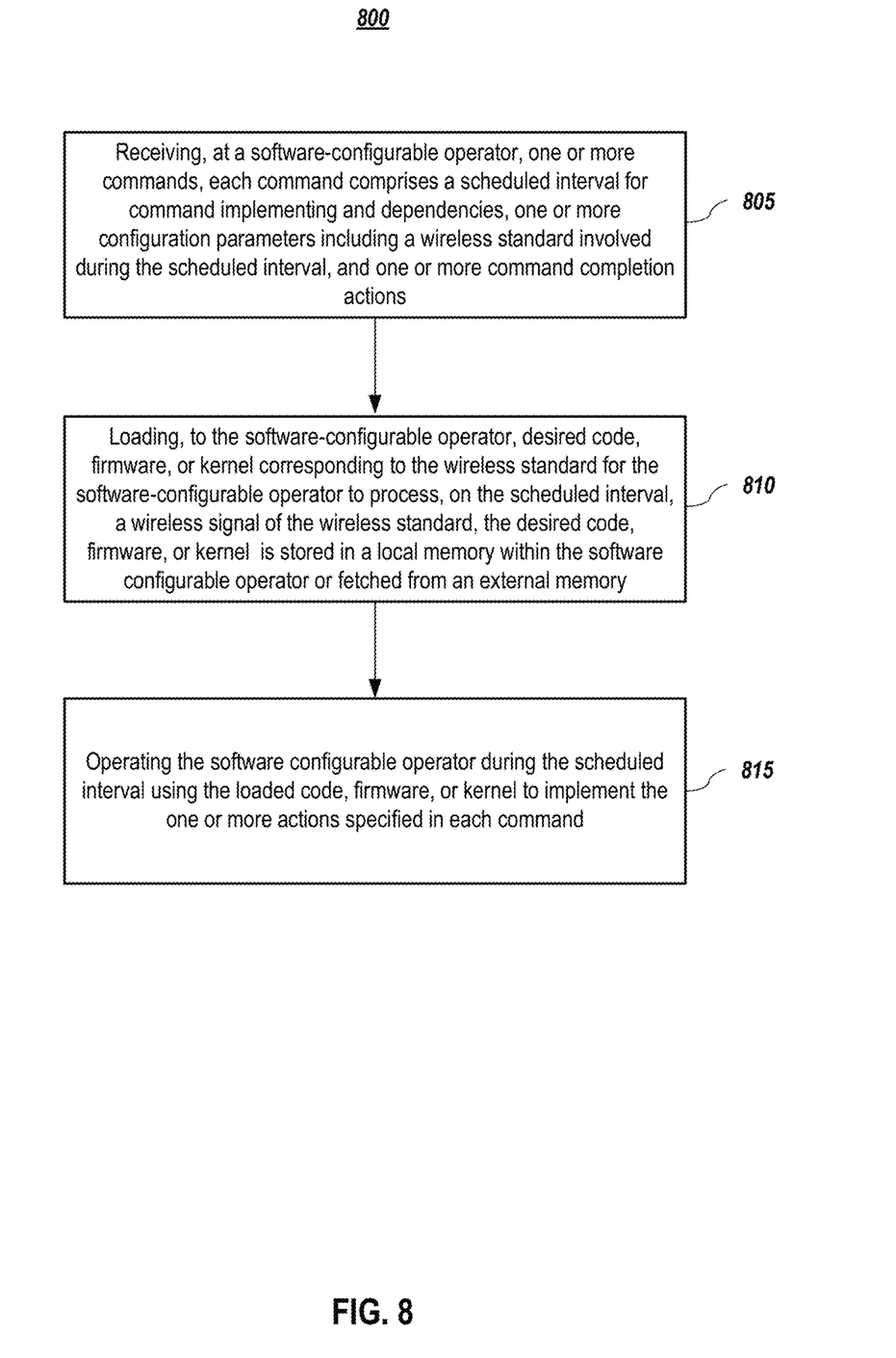
FIG. 8 depicts a process for a software-configurable operator to process signals across different wireless standards, according to embodiments of the present disclosure.

FIG. 8 depicts a process for a software-configurable operator to process signals across different wireless standards, according to embodiments of the present disclosure. In step 805, a software-configurable operator component receives one or more commands outputs from the central control unit. The software-configurable operator may be an encoder/decoder unit, a signal processing engine, an eCPRI, etc. A command may comprise a scheduled interval for command implementing and dependencies, one or more configuration parameters including a wireless standard involved during the scheduled interval, and one or more command completion actions, etc. The information in the command ensures that the command may be implemented by the receiving software-configurable operator properly. The one or more commands may be queued locally at the software-configurable operator for sequential implementation.

In step 810, the software-configurable operator loads desired code, firmware, or kernel corresponding to the wireless standard for the software-configurable operator to process, on a scheduled interval, a wireless signal of the wireless standard. The desired code, firmware, or kernel is stored in a local memory within the software configurable operator or fetched from an external memory. In one or more embodiments, the code, firmware, or kernel is relatively compact and may be loaded very quickly, e.g., in one or very few reading actions. Accordingly, the amount of time needed for code loading can be at least one order less than the scheduled interval. The code, firmware, or kernel may be loaded at the beginning of the scheduled interval without negatively impacting completion of desired actions of the software-configurable operator during the scheduled interval.

In step 815, the software-configurable operator is operated using the loaded code, firmware, or kernel loaded at the scheduled interval to implement the one or more actions specified in each command.

For a hardware-configurable operator to operate, instead of loading necessary code, firmware, or kernel corresponding to a wireless standard, the hardware-configurable operator selectively activates one or more standard-specific accelerators corresponding to the wireless standard of a wireless signal when the wireless signal is processed during the schedule interval.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for signal processing across wireless standards comprising:
   receiving, at a signal processing system, a plurality of wireless signals across multiple wireless standards;
   configuring, at the signal processing system, a configurable signal processing path to respectively process the plurality of wireless signals at a desired level of granularity, the configurable signal processing path comprises one or more software-configurable operators; and
   processing the plurality of wireless signals with the configurable signal processing path according to the configuring, the one or more software-configurable operators are operated with software corresponding to a wireless standard of a wireless signal, among the plurality of wireless signals, when the wireless signal is processed; and
   wherein the configurable signal processing path is configured by a central control unit comprising a plurality of schedulers to perform designated scheduling operation, the central control unit outputs one or more commands to each software-configurable operator for operation scheduling, each command comprises comprise a scheduled interval for command implementing and dependencies, one or more configuration parameters including an involved wireless standard involved during the scheduled interval, and one or more command completion actions.

2. The method of claim 1 wherein the configurable signal processing path further comprises at least one hardware-configurable operator, the at least one hardware-configurable operator is operated with selection of one or more standard-specific accelerators corresponding to the wireless standard of the wireless signal when the wireless signal is processed according to the configuring.

3. The method of claim 2 wherein the at least one hardware-configurable operator is an encoder and decoder unit comprising standard-specific encoders and standard-specific decoders.

4. The method of claim 1 wherein the multiple wireless standards comprise multiple standards among a group comprising at least 5G new radio (NR), Long Term Evolution (LTE), and Wi-Fi.

5. The method of claim 1 wherein the desired level of granularity is a symbol level or a block level of granularity.

6. The method of claim 1 wherein the one or more software-configurable operators comprise one or more of a sample processing unit (SPU), a signal processing engine (SPE) on a radio unit (RU), an enhanced Common Public Radio Interface (eCPRI) fronthaul on a RU, an enhanced Common Public Radio Interface (eCPRI) fronthaul, a SPE on a distribution unit (DU), a FEC on a DU, a packet processing unit (PPU), or a monolith gNodeB/eNodeB/Wi-Fi access point incorporating all of the above components.

7. The method of claim 1 wherein each software-configurable operator loads desired code, firmware, or kernel corresponding to the wireless standard at the beginning of the scheduled interval specified by each command.

* * * * *